R. J. EDWARDS.
VEHICLE SPRING.
APPLICATION FILED SEPT. 9, 1911.
1,022,228.
Patented Apr. 2, 1912.
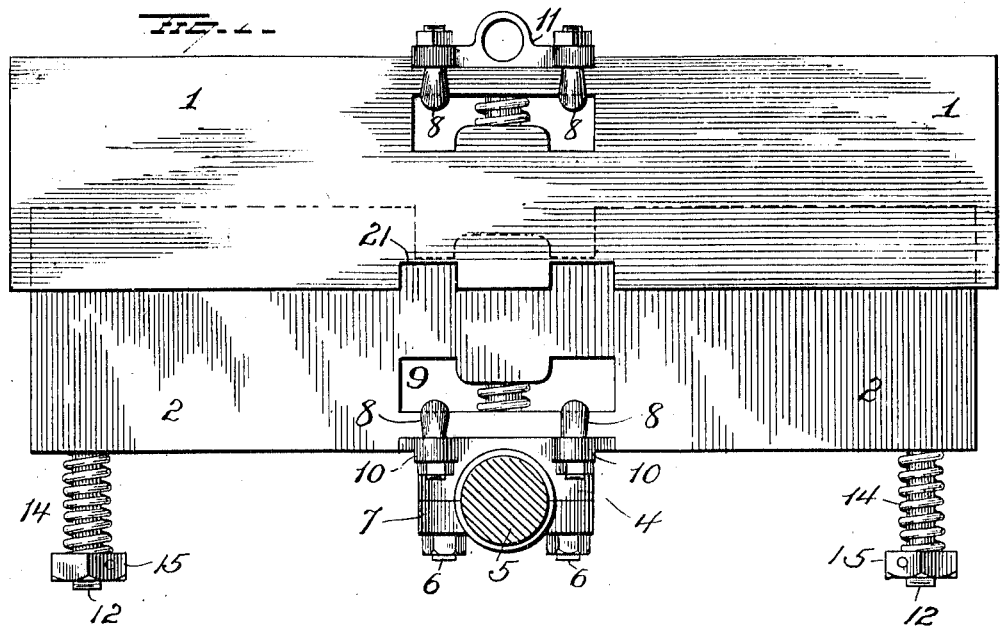
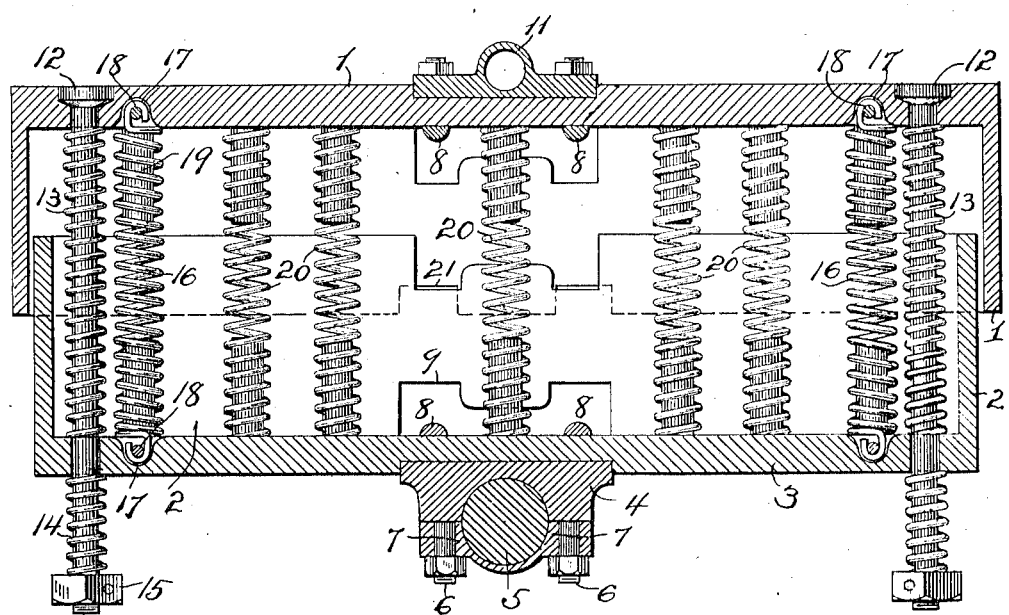
WITNESSES
E. I. Nottingham
G. I. Downing
INVENTOR
R. J. Edwards
By H. A. Seymour
Attorney

UNITED STATES PATENT OFFICE.

RICHARD JAMES EDWARDS, OF GALENA, ILLINOIS.

VEHICLE-SPRING.

1,022,228.  Specification of Letters Patent.  Patented Apr. 2, 1912.

Application filed September 9, 1911. Serial No. 648,565.

*To all whom it may concern:*

Be it known that I, RICHARD J. EDWARDS, of Galena, in the county of Jo Daviess and State of Illinois, have invented certain new and useful Improvements in Vehicle-Springs; and I do hereby declare the following to be a full, clear, and exact description of the invention, such as will enable others skilled in the art to which it appertains to make and use the same.

My invention relates to an improvement in vehicle springs, and more particularly adapted for automobiles, the object being to provide a construction which will provide the necessary elasticity, with less movement of the body of the vehicle, and also cushion or control the rebound.

With these objects in view my invention consists in the parts and combinations of parts and in the details of construction as will be more fully described and pointed out in the claims.

In the accompanying drawings, Figure 1 is a view in side elevation of my improvement, and Fig. 2 is a view in longitudinal vertical section.

My improvement comprises a casing made in two parts containing and inclosing the several springs which support and sustain the vehicle body, and also several of the springs which absorb or assist in absorbing the shock of the rebound. This casing is rectangular in shape, and the upper section 1 thereof is made, as shown, slightly longer and wider than the lower section 2, so as to overlap or telescope with the lower section. The lower section of the casing is closed at its bottom sides and ends and open at the top, and its closed bottom 3, which is thicker than the sides and ends of the section is recessed midway its ends, as clearly shown in Fig. 2 to receive the upper section 4 of the bearing which latter secures the casing to the axle 5. This section 4 is recessed to receive the axle and is provided with the stud bolts 6, by which the clamping member 7 of the bearing is secured in place. The axle may be angular at the point engaged by the two part bearing 4—7, or any other means provided for preventing the bearing from turning on the axle, in the event a simple clamp such as shown should prove insufficient in continued service. The bearing thus constructed is secured to the lower member of the casing by the clips 8 which latter are passed through the openings 9 in the sides of the casing, and through the ears 10 at the ends of section 4 of the axle bearing. The upper section 1 of the casing is similarly recessed in its top at the center for the reception of the bracket 11 by which the casing is secured to the body or body carrying frame of the vehicle, and this bracket is secured to the upper section of the casing by clips 8 in precisely the same manner as described above for securing the axle bearing to the casing.

By seating the parts 4 and 11 in recesses in the casing, the end walls of the recesses take all end thrust from the securing clips.

Secured to and depending from the top of upper member 1 of the casing near the two ends of the latter are the bolts 12, the heads of which rest in countersunk openings in the top of said section. These bolts, one near each end, pass through both sections of the casing and terminate a distance below the latter, and each is encircled within the casing by a spring 13, which latter tends to hold the two sections 1 and 2, apart, and each also carries, on its lower projecting section, a spring 14, held in place by a nut 15, the said springs 14 tending to push the lower section upwardly.

16 are springs, one near each end, provided with hook shaped ends 17 which engage pins 18 carried by the upper and lower members of the casing. These springs are supported and sustained near their free ends, by the posts 19 which latter may be integral with or secured to sections 1 and 2, and tend to pull the two sections of the casing together, or in other words they coöperate with the springs 14 to absorb and check the rebound of the casing sections.

Located intermediate the springs 16, are the main supporting springs 20, preferably five in number, each of which is mounted at its ends on posts similar to the posts 19 supporting the springs 16. These springs 20, are of a size and strength to support the maximum load for which the vehicle is intended, and permit the upper section of the casing carrying the vehicle body to yield or give sufficiently to absorb all shock, while all excessive rebound is checked or taken care of by the springs 14 and 16. The extent of movement of the upper section of the casing toward the lower section is limited by the distance between the posts 19, but this distance will be sufficient to permit of all movement necessary to absorb all shocks.

The upper section 1 of the upper casing is cut away centrally at its lower edge, as at 21, and the lower section 2 is similarly cut away at its upper end, so as to permit them to pass the clips 8 without contact in the event the load should be sufficient to cause such maximum movement of the parts.

These springs are preferably located one at, or adjacent each corner of the frame of the vehicle, and operate to perfectly cushion the vehicle frame or body both in its up and down movements, and maintain the body approximately level regardless of the movement of the wheels over uneven roads. They are designed to take the place of the ordinary elliptical springs commonly employed on road vehicles, and as they can be manufactured at much less than the ordinary springs, the cost of the vehicle will be proportionately reduced.

It is evident that changes in the construction and relative arrangement of the several parts might be made without avoiding my invention and hence I would have it understood that I do not restrict myself to the particular construction and arrangement of parts shown and described, but;—

Having fully described my invention what I claim as new and desire to secure by Letters-Patent, is,—

1. A spring for vehicles comprising a two part telescoping casing, the upper section of said casing being recessed at its top and the lower section recessed in its bottom, a bracket seated in the top recess, an axle bearing seated in the lower recess, clips passing through openings in the sides of said sections of the casing and engaging said bracket and bearing for locking same to their respective sections, and springs located within said two part casing and tending to separate the sections thereof.

2. A spring for vehicles comprising a two part telescoping casing, clips passing through openings in the sides of each section of the casing and spanning the top and bottom members respectively of said sections for securing the top section to a vehicle body and the lower section to an axle, a plurality of springs within said casing tending to hold the sections against collapsing and a plurality of independent springs also within the casing tending to prevent a separation of the said sections.

In testimony whereof, I have signed this specification in the presence of two subscribing witnesses.

RICHARD JAMES EDWARDS.

Witnesses:
FRANK J. MELLER,
JOHN HATCH.